United States Patent [19]
Sakurai et al.

[11] Patent Number: 4,765,137
[45] Date of Patent: Aug. 23, 1988

[54] EXHAUST GAS CONTROL MEANS FOR ENGINE

[75] Inventors: Tadashi Sakurai; Wataru Fuchigami, both of Iwata, Japan

[73] Assignee: Yamaha Hatsudoki Kabushiki Kaisha, Iwata, Japan

[21] Appl. No.: 22,660

[22] Filed: Mar. 6, 1987

[30] Foreign Application Priority Data

Mar. 7, 1986 [JP] Japan .................... 61-48493

[51] Int. Cl.⁴ .............................. F02B 27/02
[52] U.S. Cl. ................................ 60/313
[58] Field of Search ............... 60/313, 314, 312

[56] References Cited

U.S. PATENT DOCUMENTS

| | | |
|---|---|---|
| 933,906 | 9/1909 | Illy . |
| 1,411,226 | 3/1922 | Stumpf . |
| 2,230,740 | 2/1941 | Birkigt . |
| 2,239,262 | 4/1941 | Violet . |
| 2,305,946 | 12/1942 | Wilson et al. . |
| 2,627,851 | 2/1953 | Cushman . |
| 2,644,436 | 7/1953 | Berlyn . |
| 2,686,398 | 8/1954 | Anderson . |
| 2,717,583 | 9/1955 | Maybach ......................... 60/313 |
| 3,523,418 | 8/1970 | Marsee . |
| 3,703,937 | 11/1972 | Tenney .......................... 60/314 |
| 3,751,921 | 8/1973 | Blomberg et al. . |
| 3,817,227 | 6/1974 | Onishi . |
| 3,938,330 | 2/1976 | Nakajima et al. . |
| 3,969,895 | 7/1976 | Krizman . |
| 4,051,821 | 10/1977 | Amann . |
| 4,254,752 | 3/1981 | Friddell et al. . |
| 4,522,029 | 6/1985 | Tomita et al. . |
| 4,539,813 | 9/1985 | Tomita et al. . |
| 4,545,200 | 10/1985 | Oike et al. . |
| 4,554,785 | 11/1985 | Oike . |
| 4,558,566 | 12/1985 | Shirakura . |

FOREIGN PATENT DOCUMENTS

| | | |
|---|---|---|
| 27136 | 7/1974 | Japan . |
| 54118 | 5/1976 | Japan . |
| 72925 | 5/1985 | Japan . |
| 231156 | 9/1926 | United Kingdom . |
| 262044 | 2/1928 | United Kingdom . |
| 519806 | 4/1940 | United Kingdom . |
| 542429 | 1/1942 | United Kingdom . |
| 561932 | 6/1944 | United Kingdom . |
| 572724 | 10/1945 | United Kingdom . |

*Primary Examiner*—Douglas Hart
*Attorney, Agent, or Firm*—Ernest A. Beutler

[57] ABSTRACT

Several embodiments of exhaust systems for motorcycles that improve the engine performance by positioning reflective valve members between an expansion chamber and the exhaust ports of the engine. In each embodiment, there are provided separate valve bodies with separate valve supporting shafts that are all controlled by means of a common controller either through a single or multiple servo motors.

6 Claims, 3 Drawing Sheets

EXHAUST GAS CONTROL MEANS FOR ENGINE

BACKGROUND OF THE INVENTION

This invention relates to an exhaust gas control means for an engine and more particularly to an improved exhaust gas valve arrangement that improves the engine performance.

A well known expedient for increasing the output of an internal combustion engine is to employ large degrees of valve overlap so as to improve the breathing capacity of the engine at high speeds. However, as is well known, engines having high degrees of valve overlap tend to have poor low speed and mid range performance. It has been discovered that one reason for this poor mid range performance is the formation of pulses in the exhaust gases which tend to pass back into the combustion chamber during the period of valve overlap and cause the exhaust gases to flow outwardly through the intake passage thus precluding the induction of a proper fuel air mixture for smooth running.

As is disclosed in the copending patent applications of Hideaki Ueda, entitled "High Performance Exhaust Systems For Internal Combustion Engine", Ser. Nos. 935,340 and 935,342, filed Nov. 26, 1986, and assigned to the assignee of this application, it has been found that these poor mid range running conditions may be overcome through the use of a reflective valve that is disposed in the exhaust pipe between the exhaust ports and an expansion chamber. By appropriately positioning these reflective valves in response to the engine running characteristics, the effects of the exhaust pulses in causing reduced induction can be overcome and performance significantly improved.

In accordance with the arrangement shown in those patent applications, it is desirable to provide an individual reflective valve in each of the exhaust pipes of the engine. This, however, can cause certain problems in connection with design and operation. If individual operators and control arrangements are provided for each of the reflective exhaust valves, the system becomes very complicated and placement of all of the associated components can be difficult. However, if all of the valves are affixed for rotation with a common valve shaft, there are a number of other disadvantages which can arise. Because of the fact that the valve shaft passes through the exhaust pipes, expansion can become a problem. Furthermore, the longer the shaft becomes, the greater the expansion problems are.

Also, if the valves are all affixed to a common valve shaft, then the placement of the valves becomes interdependent and it may not be possible to place all of the valves at the optimum location. In addition to this disadvantage, the placement of all of the valves on a common valve shaft dictates that the exhaust pipes must also run parallel to each other in the area of this valve shaft. This is not always desirable or possible.

It is, therefore, a principal object of this invention to provide an improved exhaust gas control means for an engine.

It is a further object of this invention to provide an arrangement for operating a plurality of exhaust control valves simultaneously without necessitating their all being carried by a common shaft.

It is a further object of this invention to provide a multiple exhaust gas control valve arrangement wherein there is greater latitude in the positioning of the individual valves while at the same time maintaining common control system for them.

SUMMARY OF THE INVENTION

This invention is adapted to be embodied in an exhaust system for an internal combustion engine having first and second exhaust pipes. First and second reflective means are respectively supported in the first and second exhaust pipes on first and second shafts. The reflective means are rotatable so as to vary their effective area and the shafts are not mechanically coupled to each other. A single control device is provided for simultaneously activating the shafts for rotatably positioning the first and second reflective means in response to a control signal.

DETAILED DESCRIPTION OF THE PREFERRED EMBODIMENTS

Figure 1:
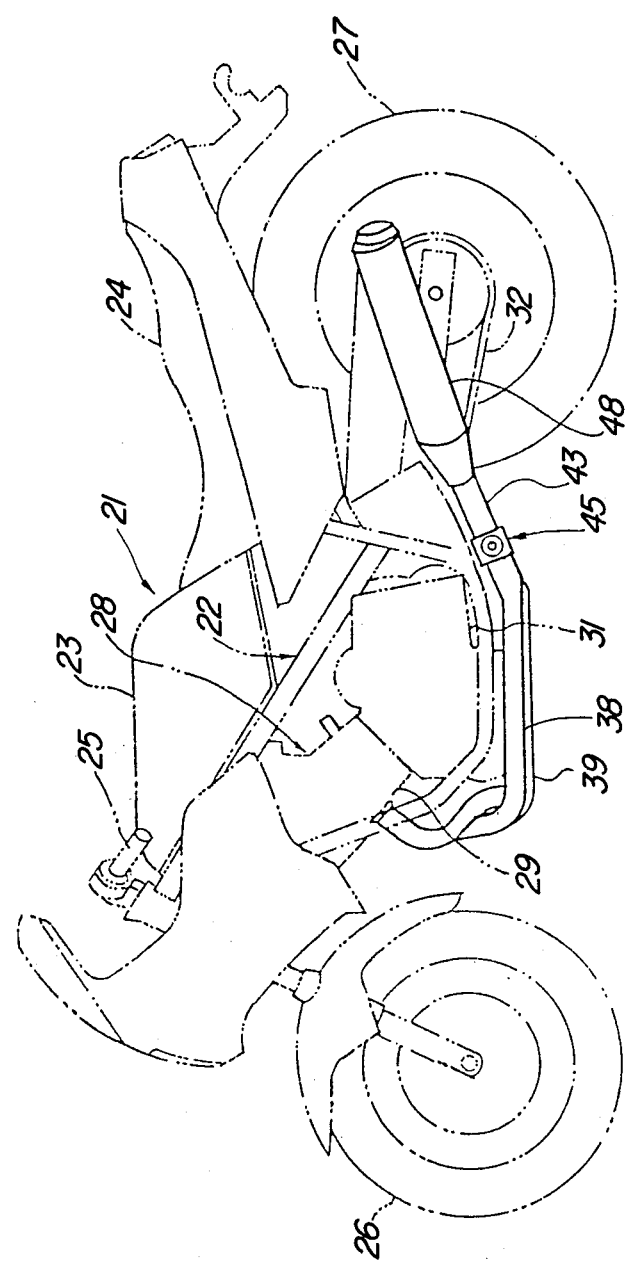
FIG. 1 is a side elevational view of a motorcycle having an exhaust system constructed in accordance with an embodiment of the invention, with portions of the motorcycle other than the exhaust system being shown in phantom.

Referring first in detail to FIG. 1, a motorcycle having an exhaust system constructed in accordance with an embodiment of the invention is identified generally by the reference numeral 21. It is to be understood that a motorcycle is only a typical environment in which the invention may be employed and that the invention has utility in a wide variety of engine applications. However, the invention has particularly utility in connection with a motorcycle since such vehicles are extremely compact and readily illustrate the way in which the invention is adapted to such compact vehicles.

Because the motorcycle 21 is depicted for illustrative purposes only, its major components have been shown in phantom and will be described only generally. The motorcycle 21 includes a frame assembly 22 that mounts a fuel tank 23 and seat 24. A handlebar assembly 25 is journaled at the front part of the frame assembly 22 for steering a front wheel 26 that is supported in any known manner. In addition, the frame assembly 22 supports a rear wheel 27 for suspension movement in any known manner.

An internal combustion engine, indicated generally by the reference numeral 28, is supported within the frame assembly 22 beneath the fuel tank 23. The engine 28 includes a cylinder block assembly 29 and a combined crankcase transmission assembly 31. The crankcase transmission assembly 31 affords a means for driving the rear wheel 27, as by means of a driving chain 32.

The engine 28 is provided with an exhaust system, indicated generally by the reference numeral 33 and which embodies the invention. The engine 28 has its cylinder block 29 formed with four cylinder bores that are aligned transversely relative to the motorcycle 21. It is to be understood that the invention may be employed in connection with engines of other cylinder numbers or configurations. However, the invention has particularly utility with engines that have at least two cylinders.

Because of its transverse disposition, the cylinder block 29 has four forwardly facing exhaust ports (not shown). Inlet flanges 34, 35, 36 and 37 of respective exhaust pipes 38, 39, 41 and 42 (FIG. 2) cooperate with these exhaust ports for receiving the exhaust gases and carrying them downwardly and rearwardly. The exhaust pipes 38 and 39 and 41 and 42 are paired for tuning purposes and merge into respective collector sections 43 and 44 which also serve as expansion chambers. A reflective control valve arrangement, indicated generally by the reference numeral 45, is interposed between the exhaust pipes 38, 39, 41 and 42 and the expansion chambers 43 and 44 for a purpose to be described. Tail pipes 46 and 47 extend rearwardly from the expansion chambers 43 and 44 and deliver the exhaust gases to a pair of mufflers 48 and 49 that lie on opposite sides of the rear wheel 27 for discharge of the exhaust gases to the atmosphere. The tail pipes 46 and 47 are interconnected by a crossover pipe 50.

Figure 3:
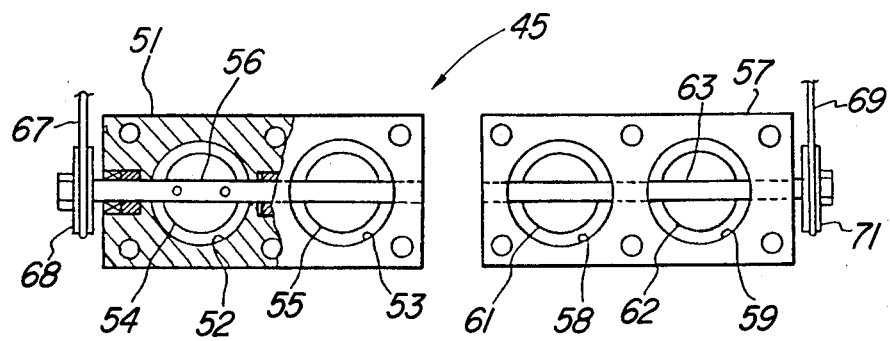
FIG. 3 is a front elevational view, on an enlarged scale, and with a portion broken away, of the control valve arrangement.
Figure 4:
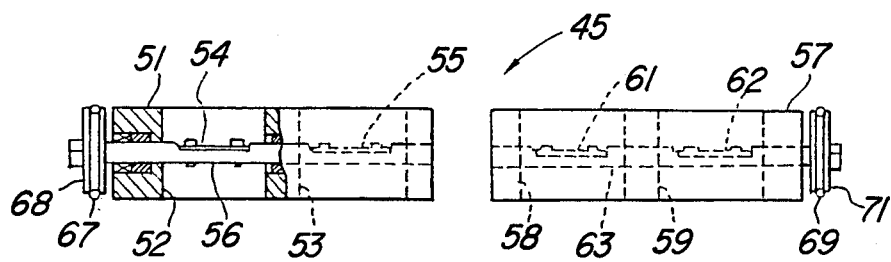
FIG. 4 is a top plan view of the control valve arrangement with a portion broken away.

The construction and operation of the control valve assembly 45 will now be described by particular reference to FIGS. 3 and 4. The control valve assembly 45 includes a first valve body 51 in which a pair of parallel, horizontally extending exhaust passages 52 and 53 are formed. The exhaust passages 52 and 53 are aligned with and connected to the discharge ends of the exhaust pipes 38 and 39 so as to pass the exhaust gases from these exhaust pipes into the expansion chamber 43.

A pair of reflective valve members in the form of butterfly type throttle valves 54 and 55 are supported within the exhaust passages 52 and 53 upon a valve shaft 56. The valves 54 and 55 are shown in their closed position and in this position they occupy approximately 50% of the effective cross-sectional area of the passages 52 and 53. Thus, the passages 52 and 53 are never fully closed even when the valves 54 and 55 are in their closed position.

The valve assembly 45 includes a second valve body 57 in which a pair of exhaust gas passages 58 and 59 are formed. The passages 58 and 59 also extend horizontally and lie on the same plane as the passages 52 and 53 of the valve body 51. The exhaust passages 61 and 62 receive exhaust gases from the ends of the exhaust pipes 41 and 42 which are, in turn, affixed to the valve body 57.

A pair of reflective valve members 61 and 62 are supported within the exhaust passages 58 and 59 on a throttle valve shaft 63. The throttle valve shaft 63 is rotatably journaled within the valve body 57.

Figure 2:
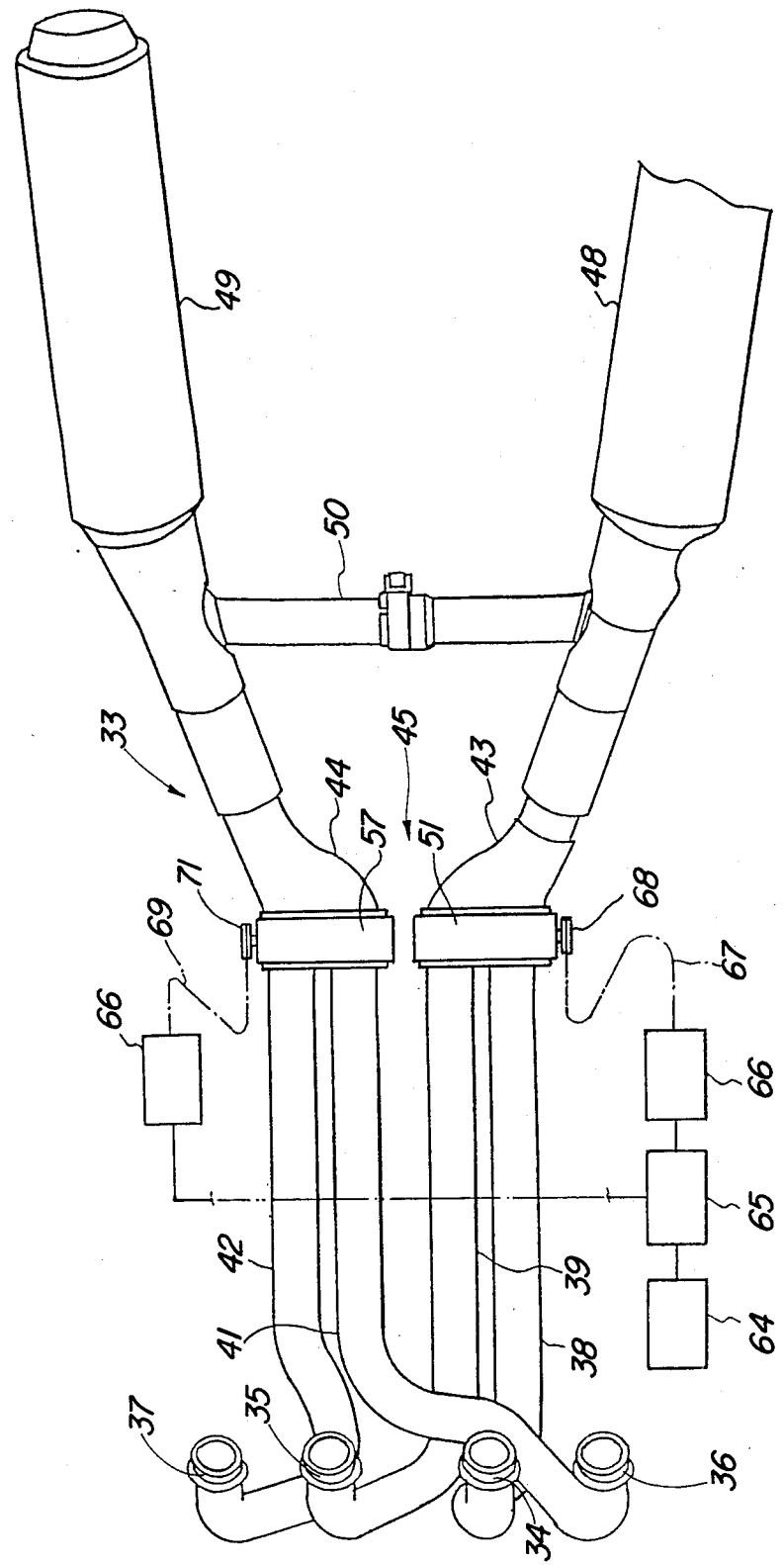
FIG. 2 is an enlarged top plan view showing the exhaust system.
Figures 5, 6:
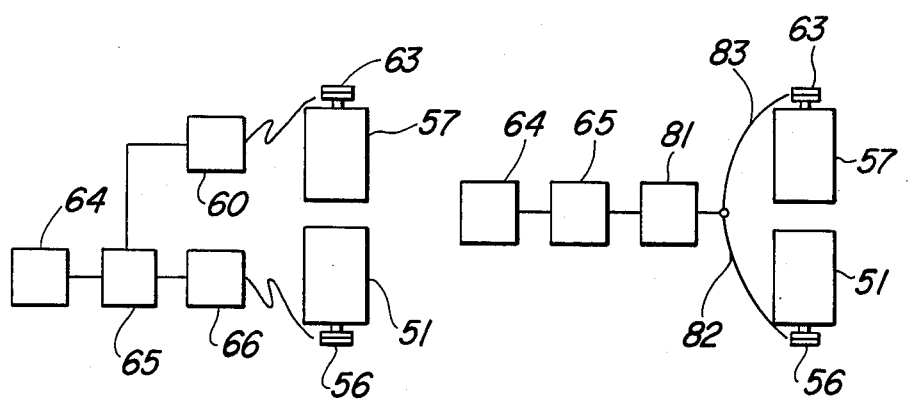
FIG. 5 is a schematic view showing the control valve arrangement of this embodiment.
FIG. 6 is a schematic view, in part similar to FIG. 5, showing another embodiment of the invention.

The structure for simultaneously operating the valves 54, 55, 61 and 62 by rotating the respective valve shafts 56 and 63 may be best understood by reference to FIG. 2 and to the schematic view of FIG. 5. There is provided a sensor device, indicated generally by the block 64 which may sense an engine condition such as engine speed. This speed or other engine condition signal is transmitted to a control device 65 that is preprogrammed so as to position the throttle valves in response to a predetermined map, for example, of the type as described in copending applications Ser. Nos. 935,340 and 935,342. In accordance with this embodiment, the control device 65 outputs the same control signals to two separate but identical driving motors 66. One motor 66 is connected to the throttle valve shaft 56 by means of a wire transmitter 67 and pulley 68. In a similar manner, the output of the other motor 66 is transmitted to the shaft 63 by means of a wire transmitter 69 and pulley 71. Thus, the throttle valves will all be operated in unison but they are not directly mechanically connected to each other.

FIG. 6 shows another embodiment of the invention which is substantially the same as the embodiment of FIG. 5 and for that reason the same components have been identified by the same reference numerals. In this embodiment, however, the controller controls a common servo motor 81 that is mechanically coupled by means of a pair of flexible transmitters 82 and 83 to the respective valve shafts 56 and 63. In all other regards, this embodiment is the same as the previously described embodiment as should be readily apparent to those skilled in the art.

In the illustrated embodiments, the valve bodies 51 and 57 are disposed so that they extend horizontally and so that the exhaust passages 52, 53, 58 and 59 are all parallel to each other and extend in the same horizontal plane. It is to be understood, however, that because of the described construction, it would be possible to locate the valve bodies 51 and 57 at an angular relationship to each other in both horizontal and vertical planes so as to suit variations in exhaust pipe configuration. Various other changes and modifications may be made without departing from the spirit and scope of the invention.

What is claimed:

1. In an exhaust system for an internal combustion engine having a first exhaust pipe, a second exhaust pipe, a first reflective means rotatably supported on a first shaft in said first exhaust pipe, the rotated position of said first reflective means being effective to vary the reflective area thereof, second reflective means rotatably supported on a second shaft in said second exhaust pipe, the rotatable position of said second reflective means being effective to vary its reflective area, said shafts being juxtaposed to each other and having adjacent ends and remotely positioned ends, a common control device operatively connected to the remotely positioned ends of said first and second shaft for simultaneously positioning said first and said second reflective means.

2. In an exhaust system as set forth in claim 1 wherein the common control device drives a pair of servo motors each associated with a respective one of the shafts for operating the shaft.

3. In an exhaust system as set forth in claim 1 wherein the common control device operates a single servo motor that is mechanically coupled to the first and second shafts for operating the first and second shafts simultaneously.

4. In an exhaust system as set forth in claim 1 further including a third exhaust pipe and a fourth exhaust pipe, said third exhaust pipe and said first exhaust pipe communicating at their outlet ends with a common expansion chamber, a third reflective means rotatably supported on said first shaft in said third exhaust pipe and effective to vary the reflective area of said third exhaust pipe, said second exhaust pipe and said fourth exhaust pipe communicating with a common expansion chamber, and a fourth reflective means rotatably supported upon said second shaft in said fourth exhaust pipe for varying the reflective area thereof.

5. In an exhaust system as set forth in claim 1 in combination with a motor vehicle powered by the internal combustion engine and having a combined engine crankcase transmission assembly for driving the vehicle, the exhaust pipes extending beneath said engine and transmission assembly with the shaft being disposed beneath said crankcase transmission assembly.

6. In an exhaust system as set forth in claim 5 further including a third exhaust pipe and a fourth exhaust pipe, said third exhaust pipe and said first exhaust pipe communicating at their outlet ends with a common expansion chamber, a third reflective means rotatably supported on said first shaft in said third exhaust pipe and effective to vary the reflective area of said third exhaust pipe, said second exhaust pipe and said fourth exhaust pipe communicating with a common expansion chamber, and a fourth reflective means rotatably supported upon said second shaft in said fourth exhaust pipe for varying the reflective area thereof.

* * * * *